(12) United States Patent
Baudisch

(10) Patent No.: US 7,629,945 B2
(45) Date of Patent: *Dec. 8, 2009

(54) MIXED RESOLUTION DISPLAYS

(75) Inventor: Patrick Baudisch, Palo Alto, CA (US)

(73) Assignee: Xerox Corporation, Norwalk, CT (US)

(*) Notice: Subject to any disclaimer, the term of this patent is extended or adjusted under 35 U.S.C. 154(b) by 92 days.

This patent is subject to a terminal disclaimer.

(21) Appl. No.: 10/015,613

(22) Filed: Dec. 17, 2001

(65) Prior Publication Data

US 2002/0167531 A1 Nov. 14, 2002

Related U.S. Application Data

(60) Provisional application No. 60/290,493, filed on May 11, 2001.

(51) Int. Cl.
*G09G 5/00* (2006.01)

(52) U.S. Cl. ............................ 345/1.3; 345/3.1; 345/660

(58) Field of Classification Search ................ 345/611, 345/531, 545; 382/269, 113; 358/450, 452; 250/208.1
See application file for complete search history.

(56) References Cited

U.S. PATENT DOCUMENTS

| | | | |
|---|---|---|---|
| 4,634,384 A | 1/1987 | Neves et al. | |
| 4,984,279 A * | 1/1991 | Kidney et al. | ................ 382/113 |
| 5,010,413 A | 4/1991 | Bahr | |
| 5,220,429 A | 6/1993 | Bergvall | |
| 5,517,209 A | 5/1996 | Holland et al. | ............... 245/119 |
| 5,726,670 A | 3/1998 | Tabata et al. | |
| 5,748,189 A * | 5/1998 | Trueblood | ................... 715/755 |
| 5,808,589 A | 9/1998 | Fergason | |
| 5,920,327 A | 7/1999 | Seidensticker, Jr. | .......... 345/523 |
| 5,923,307 A | 7/1999 | Hogle, IV | ...................... 345/4 |
| 5,949,430 A | 9/1999 | Robertson et al. | ............ 345/433 |
| H1812 H | 11/1999 | Arcuri | ......................... 345/428 |
| 6,018,340 A | 1/2000 | Butler et al. | ................. 345/339 |
| 6,088,005 A | 7/2000 | Walls et al. | ..................... 345/4 |
| 6,088,045 A * | 7/2000 | Lumelsky et al. | ............ 345/531 |
| 6,104,414 A | 8/2000 | Odryna et al. | ............... 345/536 |
| 6,115,007 A | 9/2000 | Yamazaki | |

(Continued)

FOREIGN PATENT DOCUMENTS

EP 0 618 471 A2 10/1994

(Continued)

OTHER PUBLICATIONS

Duchowski, Andrew T. "Acuity-Matching Resolution Degradation Through Wavelet Coefficient Scaling." IEEE Transactions on Image Processing, vol. 9, No. 8, Aug. 2000. p. 1437-1440.*

(Continued)

*Primary Examiner*—Aaron M Richer
(74) *Attorney, Agent, or Firm*—Oliff & Berridge, PLC.

(57) ABSTRACT

Two or more display units with different resolutions are combined such that the geometry of images displayed across the multiple display units is preserved and the image appears to be substantially continuous to a viewer of the image. Compatibility of the sizes of image elements on different display units is achieved by using display unit-specific scaling to compensate for the different pixel sizes on the individual display units.

14 Claims, 11 Drawing Sheets

U.S. PATENT DOCUMENTS

| | | | |
|---|---|---|---|
| 6,215,459 B1* | 4/2001 | Reddy et al. | 345/3.1 |
| 6,282,362 B1* | 8/2001 | Murphy et al. | 386/46 |
| 6,333,750 B1* | 12/2001 | Odryna et al. | 345/629 |
| 6,342,900 B1 | 1/2002 | Ejima et al. | |
| 6,424,320 B1* | 7/2002 | Callway | 345/1.1 |
| 6,501,441 B1 | 12/2002 | Ludtke et al. | 345/1.1 |
| 6,573,913 B1 | 6/2003 | Butler et al. | 345/761 |
| 6,611,241 B1* | 8/2003 | Firester et al. | 345/1.3 |
| 6,803,884 B1* | 10/2004 | Ohzawa et al. | 345/1.1 |
| 6,812,907 B1* | 11/2004 | Gennetten et al. | 345/1.3 |
| 7,333,071 B2 | 2/2008 | Baudisch et al. | |
| 2002/0167458 A1 | 11/2002 | Baudisch et al. | |
| 2002/0167459 A1 | 11/2002 | Baudisch et al. | |
| 2002/0167460 A1 | 11/2002 | Baudisch et al. | |

FOREIGN PATENT DOCUMENTS

EP         1 256 873 A3     11/2002

OTHER PUBLICATIONS

Wegman, Edward J., Huge-Data Sets and the Frontiers of Computational Feasibility, Journal of Computational and Graphical Statistics, vol. 4, No. 4, pp. 281-295, 1995.

Geisler, Wilson S. et al., A Real-Time Foveated Multiresolution System for Low-Bandwidth Video Communication, Human Vision and Electronic Imaging, SPIE Proceedings, vol. 3299, pp. 294-305, 1998.

Kortum, Philip et al., Implementation of a Foveated Image Coding System for Image Bandwidth Reduction, SPIE Proceedings, vol. 2657, pp. 350-360, 1996.

Mynatt, Elizabeth D. et al., Flatland: New Dimensions in Office Whiteboards, pp. 346-353, Proceedings of CHI '99. Pittsburgh: ACM.

Kreuseler, Matthias et al., Information Visualization Using a New Focus+Context Technique in Combination with Dynamic Clustering of Information Space, pp. 1-5, Proceedings of NPIVM. Kansas City: ACM.

Hereld, Mark et al., Introduction to Building Projection-Based Tiled Display Systems, Proceedings of IEEE Computer Graphics and Applications, vol. 20, No. 4, pp. 22-28, 2000.

Maglio, Paul P. et al., Tradeoffs in Displaying Peripheral Information, pp. 241-248, Proceedings of CHI 2000. vol. 2, Issue 1, The Hague, Amsterdam: ACM.

Furnas, George W. et al., Considerations for Information Enviroments and the NaviQue Workspace, Proceedings of ACM conference on Digital Libraries 1998, pp. 79-88.

Rekimoto, Jun et al., Augumented Surfaces: A Spatially Continuous Work Space for Hybrid Computing Enviroments, pp. 378-385, Proceedings of CHI '99. Pittsburgh: ACM.

Bjork, Staffan et al., A Framework for Focus+Context Visualization, Proceedings of INFOVIS 1999.

Cruz-Neira, Carolina et al., Surround-Screen Projection-Based Virtual Reality: The Design and Implementation of the CAVE, Communications of the ACM, Jun. 1992, pp. 64-72.

Loschky, Lester et al., User Performance with Gaze Contingent Multiresolutional Displays, Proceedings of the Eye Tracking Research & Applications Symposium, 2000. Palm Beach Gardens: ACM pp. 97-103.

Danforth, Robert et al., A Platform for Gaze-Contingent Virtual Enviroments, American Association for Artifical Intelligence, 1999.

Geisler, Wilson S. et al., Variable-Resolution Displays for Visual Communication and Simulation, Proceedings of Society for Information Display '99, vol. 30, pp. 420-423, 1999.

Grudin, Jonathan, Partitioning Digital Worlds: Focal and Peripheral Awareness in Mulitple Monitor Use, Proceedings of SIGCHI '01, vol. 3, No. 1. Seattle: ACM.

\* cited by examiner

MIXED RESOLUTION DISPLAYS

This patent application claims priority benefit from US Provisional Application No. 60/290,493 filed May 11, 2001.

REFERENCE TO RELATED APPLICATIONS

This patent application is related to copending U.S. patent application Ser. No. 10/015,642 titled "Methods of Using Mixed Resolution Displays", by Baudisch et al., U.S. patent application Ser. No. 10/015,680 titled "System Utilizing Mixed Resolution Displays", by Baudisch et al. and U.S. patent application Ser. No. 10/015,677 titled "Methods of Using Mixed Resolution Displays", by Baudisch et al. all filed concurrently herewith.

INCORPORATION BY REFERENCE

The following patents and/or patent applications are herein incorporated by reference:
U.S. Pat. No. 6,018,340, titled "Robust Display Management in a Multiple Monitor Environment", by Butler et al. and issued on Jan. 25, 2000,
U.S. Pat. No. 5,949,430, titled "Peripheral Lenses for Simulating Peripheral Vision on a Display Device", by Robertson et al. and issued on Sep. 7, 1999,
U.S. Pat. No. 5,920,327, titled "Multiple Resolution Data Display", by Seidensticker, Jr., and issued on Jul. 6, 1999,
U.S. Pat. No. 6,088,005, titled "Design and Method for Large Virtual Work-space", by Walls et al. and issued on Jul. 11, 2000,
U.S. Pat. No. 5,923,307, titled "Logical Monitor Configuration in a Multiple Monitor Environment", by Hogle, IV and issued on Jul. 13, 1999

BACKGROUND

This invention relates generally to displaying and managing windows and images within a multiple display area environment where at least one of the display areas has a larger pixel size than at least one other of the display areas A typical computer system includes a computer having a central processing unit, an input/output unit and memory containing various programs used by the computer such as an operating system and one or more application programs. An end-user of the computer system communicates with the computer by means of various input devices (keyboard, mouse, pen, touch screen, voice, etc.), which transfer information to the computer via the input/output unit. The computer responds to this input data, among other ways, by providing responsive output to the end-user, for example, by displaying appropriate text and images on the screen of a display monitor.

Operating systems often include a graphical user interface ("GUI") by which the operating system and any applications it may be running (e.g., a word processing program) may communicate with the end-user. One commonly used GUI implementation employs a desktop metaphor in which the screen of the monitor is regarded as a virtual desktop. The desktop is an essentially two-dimensional working template area supporting various graphical objects, including one or more display regions. Information is displayed on the desktop within the display regions (e.g., window, dialog box, pop-up menu, pull-down menu, drop-down list, icon), which typically are rectangular in shape, although many shapes and sizes are possible. Each display region may be dedicated to a specific application or to the operating system under which the applications are running. By manipulating a cursor (such as with standard point & click techniques), an end-user can manage the display regions as desired, for example, by creating new display regions or eliminating old ones, or by resizing or repositioning the display regions to fit the end-user's needs. The end-user may "activate" a particular display region and its associated application, for example, by "clicking" the cursor when it appears within the desired region.

The screen size and resolution available to consumers has grown over the past years, but not as fast as the increase in storage and computational power has empowered users to work with larger data objects. For many tasks involving visual representations, the display thereby has become the bottleneck of computer systems. When a user's display is not able to display the number of pixels required for displaying all the desired information at once, users have the following choices:
  (a) They can navigate (e.g. zoom and pan) the display manually to acquire the information sequentially. Additional navigation means additional user effort.
  (b) They can replace the current display with a display able to display the required number of pixels, i.e. a "large high-resolution display". Current technology is able to provide large high-resolution displays, but technologies proposed so far for such displays are still cost-intensive, space-intensive, or both, which has prevented these technologies from reaching the mass market.
  (c) They can use an appropriate visualization technique that allows fitting the required data into a small screen by reducing the space allocated for irrelevant information. The two main approaches utilized in information visualization techniques are overview plus detail views (B. Shneiderman. *Designing the User Interface: Strategies for Effective Human-Computer Interaction.* Third edition. Reading Mass.: Addison-Wesley, 1998.) and fisheye views (George Furnas, "Generalized Fisheye Views," CHI '86, Proceedings, pp. 16-23).

Overview plus detail visualizations use two distinct views: one showing a close-up and the other showing the entire document. The drawback of this approach is that it requires users to visually switch back and forth between the two distinct views and to reorient themselves every time they switch. Fisheye views avoid the distinction between two views by keeping adjacent information together. The switching between detail region and periphery is thereby accelerated. However, the downside of this approach is that it introduces distortion, which makes some content, for example photographic content, difficult to recognize. Both of these visualization techniques use different scaling for the different display regions, making it difficult to visually compare sizes and lengths between objects located in different regions.

To alleviate this problem, a computer system with a display called a "mixed resolution display" has been used. Mixed resolution displays combine two or more display units with different resolutions such that the geometry of displayed images is preserved. Objects displayed across multiple display units preserve size and shape, although their resolution changes.

There are two different ways of perceiving a mixed resolution display. Firstly, mixed resolution displays can be considered normal, monitor-sized displays that are enhanced with additional low-resolution display space in the periphery. Secondly, mixed resolution displays can be considered large low-resolution displays that are enhanced with a high-resolution region in the center, similar in concept to a "magic lens". For a description of the "magic lens" system please see a paper by: Bier, E. A., Stone, M. C., Pier, K., Buxton, W., and DeRose, titled "T. D. Toolglass and magic lenses: the see-through interface" in the *Proceedings of the 20th annual conference on Computer graphics*, 1993, Pages 73-80.

A study by Jonathan Grudin (Grudin J., "Partitioning Digital Worlds: Focal and Peripheral Awareness in Multiple Monitor Use", pages 458-465, of the Proceedings of the SIG-CHI conference on Human factors in computing systems, CHI 2001, ACM Pressshows that users do not use a combination of two or more display units as a single display area, even though they show adjacent parts of the same computer desktop. The gap between the two display units may be accountable for this behavior. In order for an image displayed on a mixed resolution display to be perceived as a single image, the following basic properties of the image have to be preserved.

(a) Geometry-preservation: The geometry of displayed images should be distorted as little as possible. Angles, the ratio between lengths, and the ratio between surfaces of the displayed image should correspond as closely as possible to those of the image when it was created. Images that were created by projecting onto a flat surface (e.g. the film in a camera or the projection plane in a 3D rendering program) are best displayed by displaying using a flat surface, so that angles, distance relations, and size relations are preserved.

Multiple monitor configurations have been used to create hybrid displays. For example see U.S. Pat. No. 6,018,340, titled "Robust Display Management in a Multiple Monitor Environment", by Butler et al., issued on Jan. 25, 2000. However this implementation, does not offer the size preservation described above. When an image is displayed across two or more monitors that display their content using different pixel sizes (e.g. when the user is moving an image from one monitor to another), the two portions of the image on the individual monitors are displayed in different sizes, disrupting the user's perception of a continuous image.

(b) Color-continuity: The colors in the image should be retained, as closely as practicable to the colors in the image when it was created. For example, if two points in the image were the same color in the original image, then they should have the same or very similar colors in the displayed image.

(c) X/Y continuity: The gap between the visible display regions of the individual display units (the X/Y gap) should be as small as possible for a viewer located directly in front of the mixed resolution display.

(d) Z-continuity: Points that were in the same plane in the original image should be in the same plane or close to the same plane in the displayed image. The distance between the display planes of two or more display units (the Z gap) should therefore be as small as possible.

(e) Time-continuity: Dynamic images should preserve as closely as practicable lapsed time continuity between events. For example, in a computer animation, a video, etc. two changes that take place with a certain time distance in the original dynamic image should happen in the same order and with the same time distance in the displayed image.

Multiple monitor configurations to extend the user's display space have not always been able to maintain this parameter. For example, in a paper by Feiner, S. and Shamash, A., titled "Hybrid user interfaces: breeding virtually bigger interfaces for physically smaller computers", *Proceedings of the Fourth Annual ACM Symposium on User Interface Software and Technology*, pages 9-17, 1991, a system is described showing a hybrid display consisting of "goggles" worn by the user along with a single monitor. This solution requires tracking the user's head position. The lag resulting from the tracking mechanism inserts an undesirable time-discontinuity.

Mixed resolution displays try to address some of these criteria. Mixed resolution displays combine two or more display units with different resolutions such that basic properties of an image displayed on it are preserved. When images elements are displayed across multiple display units of a mixed resolution display, the image elements are displayed using the same size and shape, although they are displayed on display units with differently sized pixels. Additionally, the system introduces no inherent time lag between display units.

SUMMARY OF THE INVENTION

Two or more display units with different resolutions are combined such that the geometry of images displayed across the multiple display units is preserved and the image appears to be substantially continuous to a viewer of the image. Compatibility of the sizes of image elements on different display units is achieved by using display unit-specific scaling to compensate for the different pixel sizes on the individual display units. Several embodiments for combining multiple display units, at least two of which use differently sized pixels, into a mixed resolution display are described. One embodiment combines a flat high-resolution display, such as an LCD, with a projection display, such that the display area of the high-resolution display is surrounded by the display area of the projection display. The visible gap between the two display units is minimized, while using minimal space and a cost-efficient setup.

DETAILED DESCRIPTION OF THE INVENTION

Imaging System

Figure 1:
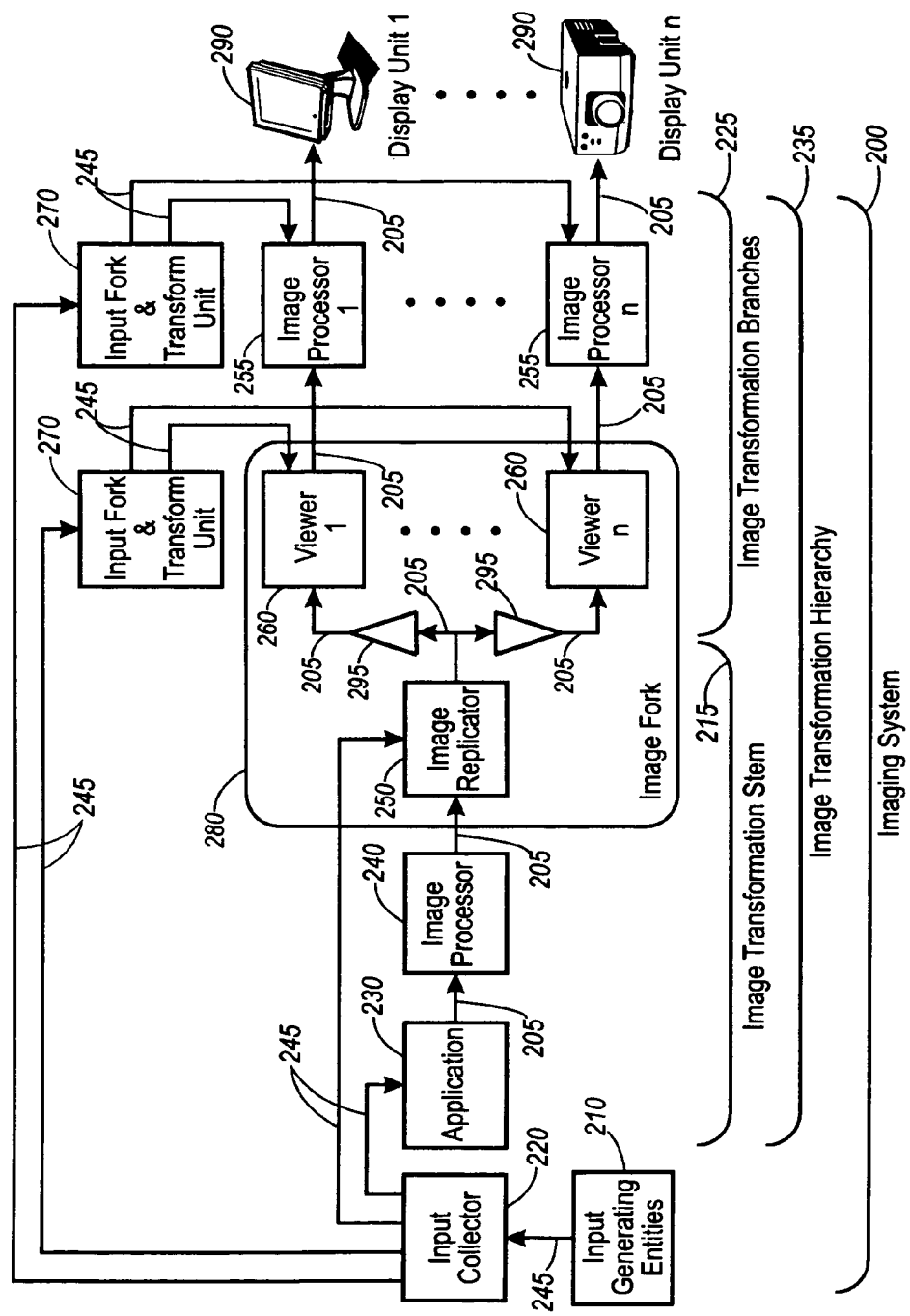
FIG. 1 is a diagram of an imaging system.

FIG. 1 shows the architecture of the imaging system 200 required for displaying an image on a mixed resolution display comprised of several display units 290.

The term image is defined as arbitrary graphical content. The image can be static (e.g. a photograph) or dynamic (e.g. a video or the output of a program continuously generating graphical output), digital or analog. The image could use any type of representation, such as a raster-based, vector-based, scan line-based or any other representation. The image can be encoded using any encoding scheme, such as bitmap format, gif, jpeg, mpeg, any video format such as AVI, DV, NTSC, PAL or any other format used for encoding images. Images can be any shape or form, such as rectangular, round, irregular shapes or any shape that can be encoded in the encoding scheme. The images may include alpha-numerics, text, symbols, graphics, pictures, drawings or any combination of these. The images may be intended for human viewing, or they may be machine-readable or both.

Figure 2:
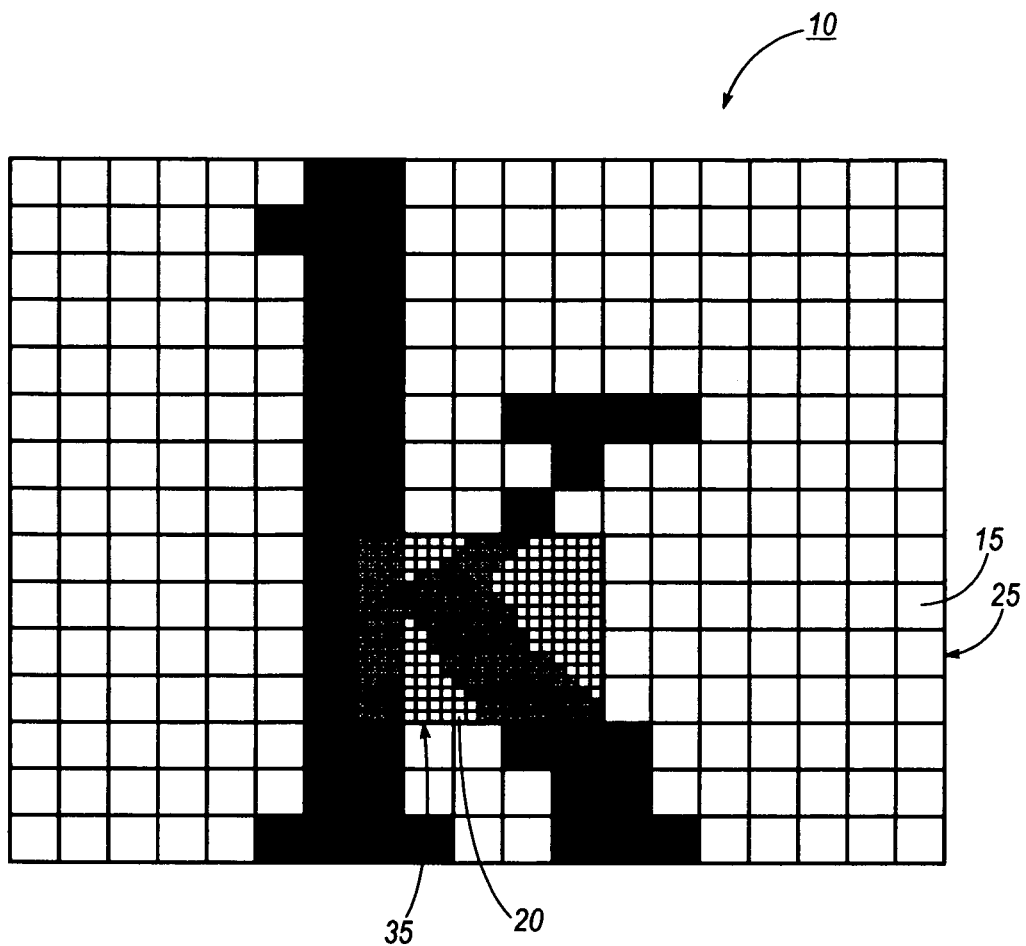
FIG. 2 is a diagram of an image displayed on a mixed resolution system.

The imaging system 200 is used to display an image or series of images across several display units 290, such that angles, length, and surface relationships in the displayed image correspond to those in the original image, although the display units 290 use different pixel sizes, such as that shown in FIG. 2. FIG. 2 shows an image 10, in this example an image of the letter "k", displayed across a display area 25 having pixels 15 and display area 35 having pixels 20 where the size of the pixels 15, 20 in the display areas 25, 35 are different. In this example, pixel 15 has an area that is a factor of sixteen larger than pixel 20. The display area 25 with the larger pixel 15 may be referred to as the "context area" and the display area 35 with the smaller pixel 20 may be referred to as the "focus area". The focus area contains a portion of the entire image 10 displayed at a higher resolution.

As can be appreciated by viewing FIG. 2, unless the images displayed in the focus area and the context area are aligned and sized correctly, the image will not appear to be continuous. For instance, if the image displayed in the focus area were shifted or translated with respect to the image displayed in the context area this would result in a misalignment or discontinuity in the image. Further if the image in the focus area were either enlarged or reduced relative to the image displayed in the context area this would also introduce discontinuities in the image. Additional image discontinuities would further be introduced if the images in the focus and context areas were of different colors, shadings, rotational orientations, etc.

FIG. 1 is an exemplary overview diagram that shows what components may be used to implement an embodiment of the imaging system 200. The imaging system 200 may be implemented in a variety of ways depending on the application and may not require all the components shown in FIG. 1. For example, the buffers 295, input collector 220, or one or more image processors 240, 255 may not be necessary in some embodiments. Additional buffers 295 may be added to process data in an asynchronous fashion in-between various components shown in FIG. 1. Any of the components can be implemented as either specialized hardware or software or customizable hardware or customizable software.

All the components could be implemented in a single machine or in a distributed system. For example, all of the shown processing units may be located inside the same physical machine, or they may be distributed over multiple machines.

Graphical data communication channels 205 and user input communication channels 245 allow data to be transferred between various components in the imaging system 200 and display units 290. Communication channels 205 may be software connections inside a machine, such as socket connections, named pipes, clipboards, program interfaces and other software mechanisms that allow software programs to communicate with each other or with hardware devices. In hardware, the communication channel could be implemented in several ways, by means of a cable, RF network, IR connection, fiber channel connector, circuit board, or other methods of transporting data with enough bandwidth to provide a reliable communication channel between components as described above in FIG. 1. It may also be a combination of software and hardware, such as a network cable and a network protocol.

Application 230, image processors 240, image replicator 250, and viewer 260 can be implemented using software, digital hardware, or analog hardware. The display units 290 can be implemented using digital or analog hardware. If the individual components are not all analog or digital, matching converters have to be inserted between them, such as analog-digital and digital-analog image converters.

Moving on to the operation of the imaging system 200, input generating entities 210 provide user input to input collector 220 by a communication channel 245. Input generating entities 210 can include various sources, such as one or more users using peripherals, such as a mouse, keyboard, joystick, voice recognition system or other peripherals, to generate user input, computer file systems and data streams. The input provided by the input generating entities 210 could consist of analog data or digital data.

The input collector 220 collects all the input from the various input generating entities and forwards the input as data to various other components in the imaging system 200 as appropriate as well as suppresses certain types of input that may decalibrate the display. The input collector 220 can be implemented in software as one or more programs or in hardware (e.g. a customized input device) or as any combination of multiple software programs and/or multiple hardware devices. One of the components that the input collector forwards data to is the application 230. The application 230 utilizes the data sent to it from the input collector 220 to generate an image, image data, or image instructions, or other image information, which can be transformed into an image. The application 230 then sends the generated image to an image processor 240 for additional processing, format translation etc. if needed. The image processor 240 may not be needed in some systems if the application 230 generates image information in a format, which is readily usable, by the image replicator. The image processor 240 could be implemented using a single image processor 240 or as a series of image processors 240 which may or may not have buffers between them. When the image processor 240 has completed its tasks, it sends image data to the image fork 280.

The image fork 280 comprises an image replicator 250, and two or more viewers 260. The image replicator 250 receives the image data and uses it to generate multiple images, which it passes to the viewers 260. Each viewer 260 is associated with a single image transformation branch 225 and display unit 290. Shown in FIG. 1 are two viewers 260, one for each image transformation branch 225 and display unit 290. However, in some embodiments it may be desired to have more display units 290. If more than two display units 290 are desired, then there will be an equivalent number of image transformation branches 225, and each image transformation branch 225 will have a viewer 260. In one embodiment the viewers 260 consisted of an application capable of receiving display input and determining the necessary-transformations for viewing on a display 290. Consequently, the image viewers 260 were used to transform the data appropriately for its resultant display unit 290. In another embodiment, the viewers 260 consisted of a hardware device that receives image information from the environment and translates this into the appropriate form for viewing on display 290.

There are many ways of implementing the image fork 280 such as a single program able to show an image in multiple windows, multiple programs running on a single computer, multiple machines connected over a network, one or more pieces connected via a communication channel of image processing hardware, etc.

After leaving the viewers 260 of image fork 280, the image data is sent to image processors 255. Image processors 255 could be implemented using a single image processor 255 or as a series of image processors 255 which may or may not have buffers 295 between them. Each of these image processors 255 is associated with a specific display 290. Each image processor 255 receives the data from the viewer 260 associated with it display unit 290 and transforms the data appropriately to drive the display 290. However, it should be noted, that if data from the viewer 260 is independently capable of driving the display unit 290, then image processor 255 would not be necessary.

To achieve the desired perceived continuous display of the displayed image, each of the image transformation branches starting with the viewers 260 and including the subsequent image processors 255, must produce the correct image for their associated display 290. If the display units 290 are in the same plane, not rotated with respect to each other and produce the same color, it is sufficient to have translation, scaling, and clipping functionality for that purpose. In more complex setups including display units of different types, color correction, rotation, distortion, or other functions may be required. In various embodiments the appropriate scaling factors and other image manipulation necessary for each of the separate images to display correctly on the associated display unit 290 can be provided by the image replicator 250, or any element in the image transformation branches 225 such as the viewers 260 or image processors 255 or any combination thereof. If the image processor 255 is implemented as a series of image processors then the last image processor 255 in the series delivers the image to the respective display units 290.

The path discussed from input generating entities 210 to application 230 to image processor 240 to image fork 280 to image processor 240 to display units 290 or image transformation hierarchy 235 is for image data. While for some embodiments, this may be all that is necessary to provide the required image data to the display units 290, including interactive behavior, other embodiments may allow the system to show interactive behavior using non-image input or navigation input which bypasses the image transformation hierarchy 235. In such systems the navigation input must be forwarded to the respective components for processing. In such cases the navigation input will be forwarded to the appropriate component that has the facility to receive and manipulate the image data based on the navigation input. These components could be either the viewers 260 or image processors 255 or any combination of these elements. This is shown by utilizing input fork and transform units 270 to supply the navigation input to the viewers 260 and image processors 255. It should be noted that the image fork and transform units are used to insure that all the elements at a particular point in the image transformation branches receive the same data from the navigation input. Non-image or navigation input can consist of mouse movement, keyboard input, panning, and selection of regions or any other form of navigation task.

The input collector 220 collects the navigation input from the input generating entities 210 as discussed earlier. After determining which input is navigation input, the input collector 220 forwards the input to the input fork and transform units 270. The input collector 220 classifies received input from the input generating entities 210 according to which transformation unit 270 it is intended for. The input fork and transform unit 270 receives input from an input collector 220 and transforms this input accordingly. Some example transformation functions are scaling, panning, scrolling, selecting regions, or by applying other methods to the data to change the input values into another value to be output. The input fork and transformation unit 270 could be implemented as software, such as a program that scales mouse movement by a certain ratio and sends the appropriately scaled movement to the appropriate viewer 260. The input fork and transformation unit 270 could be implemented as hardware, such as circuitry built into a device that allows the electronic signals to be scaled. This is the case for a single forking point at the image replicator 250. The system could alternatively be implemented using multiple forking points with multiple image replicators 250 to obtain a tree-like system.

The input fork and transform unit 270, viewers 260, and image processors 255 should not introduce any additional image content, such as borders or artifacts that would distort the perceived continuous image. If such content is present, it must be removed prior to display on the displays 290. For instance the creation of borders around the images displayed will create artificial separations between the display areas, similar in effect to each of the displays 290 having borders. This can be avoided by scaling images so that they do not interfere with the perceived continuous image. For example, applications could use full screen mode, if available, or additional image content can be removed in a later transformation using scaling and/or clipping in image processor 255. Alternatively, an overlapping display 290 setup can be used.

Calibration of Display Units

Figure 3:
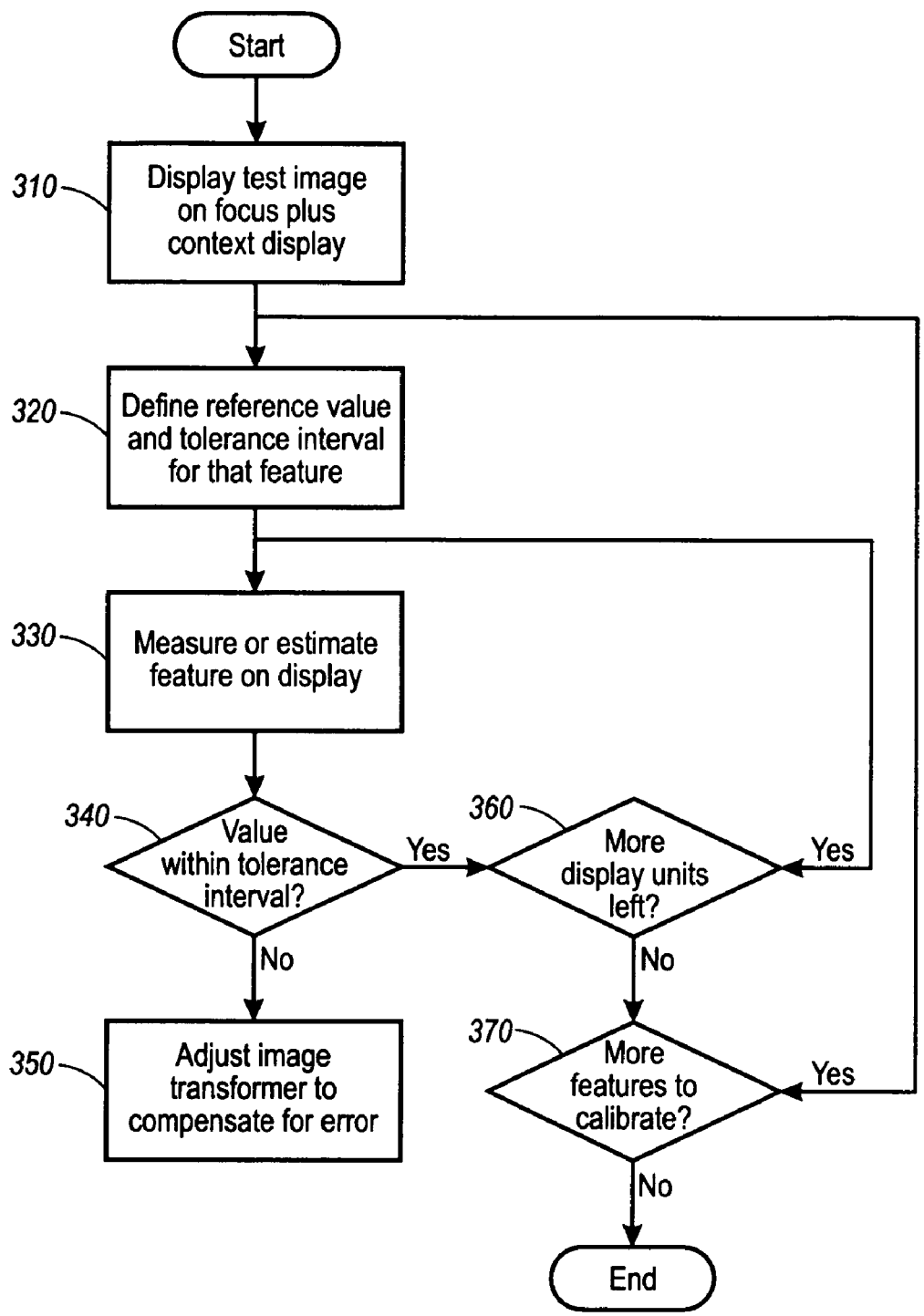
FIG. 3 is a flowchart showing the calibration process of a mixed resolution display.

In order for the images on the display units 290 to be aligned with each other and provide a single perceived image of mixed resolution, the display units 290 must be calibrated. Generally calibration will include determining values for translation and scaling of the images, but depending on the setup may also include values for rotation, distortion, brightness and color, etc. During calibration of the system the input collector 220 and input fork and transform units 270 may be deactivated to allow the image transformers in the individual branches to be accessed independently. FIG. 3 describes a flow chart for calibrating the system of image transformation branches 225.

If the pixels on the individual display units 290 have different aspect ratios, scaling may be carried out in two steps; one step for horizontal scaling and a second step for vertical scaling.

For each dimension to be calibrated, a test image is required that shows a feature of that dimension in each individual display 290. When calibrating scaling, for example, the test image has to show at least one image element of known size in each display unit. A text image reusable for calibrating the geometric dimensions scaling, translation, rotation, and distortion may, for example, show a labeled grid. To also allow calibrating color-related dimensions such as brightness, contrast, white balance or color balance a labeled color gradient may be added to the test image. If such a test image is not already available, the user can create one, using image processing software.

For each dimension to be calibrated, calibration can now be done as shown in FIG. 3. In some systems, it may be convenient to calibrate scaling first as scaling may affect translation. First, the test image has to be displayed on the mixed resolution display as shown in box 310. Once the text image has been displayed the user picks a reference value and a tolerance interval for that feature as shown in box 320. In the case of vertical scaling, the reference value would be the desired height in millimeters of an image element contained in the test image. The tolerance interval should be selected in accordance with the precision provided by software and hardware.

Once the reference value and tolerance interval are selected, then the value of the feature as currently displayed on the individual displays 290 must be measured or estimated as shown in box 330. In the case of scaling, this can be accomplished by using a ruler to measure the sizes of the reference image element in the different display units. If the measured value lies outside the tolerance interval, then one of the image transformers capable of transforming that feature for the respective display unit must be adjusted to compensate for the error as shown in box 350. This element could be viewers 260, input fork and transform units 270, image processor 255 or any combination of the above. Which unit is adjusted will depend on the individual system being used. For example, if the ratio between desired and measured size of the test image element was 5/3, an image transformer in the respective image transformation branch 225 should be adjusted by the inverse of that factor, i.e. 3/5. The adjustment procedure is then repeated for that display and dimension until the measured value lies within the tolerance interval.

Once one of the displays 290 has been calibrated, the user moves to box 360 and ascertains if there are more displays 290 units to calibrate. If so, the user repeats the above process until all displays 290 have been calibrated. At this point, all displays 290 have been calibrated for a specific feature. The user must then determine if there are more features to calibrate as shown in box 370. If so, then the procedures are repeated until all displays 290 are calibrated for all features.

Now that the system has generally described, the following descriptions will proceed to describe some examples of specific embodiments.

Embodiment 1

VNC Implementation

Figure 4:
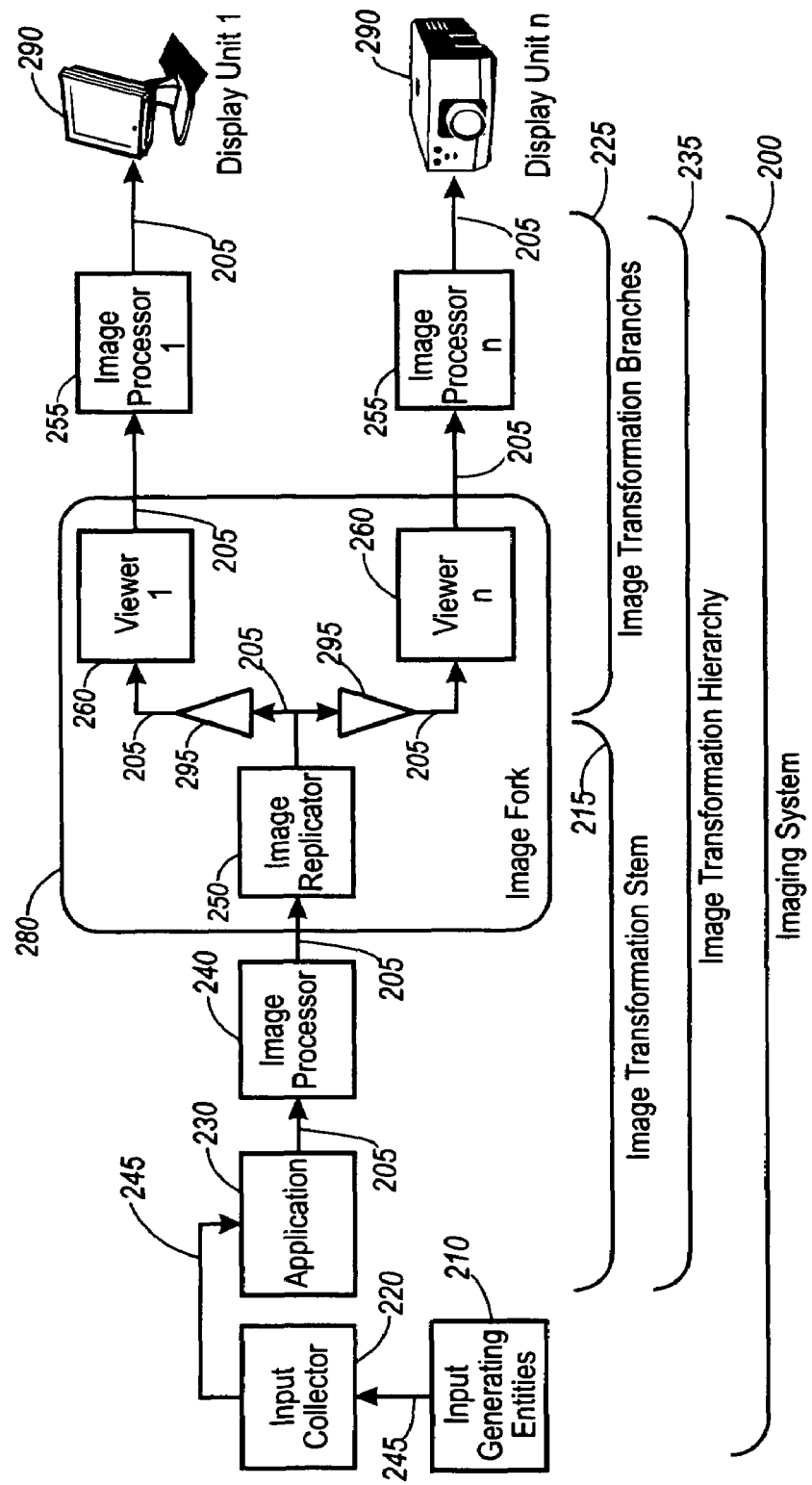
FIG. 4 is a diagram showing an embodiment of the present invention.

FIG. 4 shows one embodiment of the imaging system 200 implemented with several computer systems linked together over a network. As this embodiment refers to the same components shown in FIG. 1, the same reference numerals will be used to denote similar components. The displays 290 were implemented using a projection system and a LCD screen. The Virtual Network Computing (VNC) software, available from AT&T under the GNU public license, was used to implement a large portion of the image system 200. In essence, the VNC software is a remote display system that allows a user to view a computing 'desktop' environment not only on the machine where it is running, but from anywhere on the Internet and from a wide variety of machine architectures. The VNC server program was run on a computer system running the Linux operating system (Linux computer) and implemented a portion of the input collector 220, application 230, image processor 240, and the image replicator 250. Two instantiations of the VNC client program was run on a computer system using Microsoft Windows (Microsoft computer) and implemented the remaining portion of the input collector and the viewers 260. The VNC server program created a large virtual frame buffer, which provides space in the memory of the Linux computer for holding the entire image. Both the Linux computer and the Microsoft computer had network capability to allow it to communicate with other elements of the imaging system 200.

As discussed earlier the input generating entities 210 could be a user using peripherals to generate user input. These devices are connected to the Microsoft computer and either one of the instantiations of the VNC viewer receives the user input. The VNC viewer software then immediately passes the user input to the VNC server software running on the Linux computer. The VNC viewer which initially receives the user input together the VNC server to which it immediately passes the user input perform the input collector 220 functions. The VNC server then communicates with the desired desktop application 230 running on the server for which the input is intended. Once the desktop application 230 has had an opportunity to receive and process the user input passed to it by the VNC server, it communicates the resultant image information back to the VNC server. The VNC server then performs the roles of the image process 240 by reformatting the data appropriately for the next step and the image replicator 250, by making two copies of the image data. The result is that two copies of bitmap image data are made by the VNC server. The VNC server then provides two copies of the image data to the two instantiations of the VNC viewer software, which are the viewers 260, one for the LCD display and one for the projection system display. The two instantiations of the VNC viewer software scale the data for their respective display units 290 and then communicate the scaled image data to two image processors 255 via a driver included with the Microsoft computer. The image processors 255 were implemented in the Microsoft computer using two graphic display adapters. The two image processors 255 convert the scaled image data to a format appropriate for driving their respective display units 290 and communicate directly with LCD display and the projection system.

The LCD display and the projections system were connected to the Microsoft computer as a two-headed display, for an example of this type of setup see U.S. Pat. No. 6,088,005, titled "Design and Method for Large Virtual Workspace", by Walls et al. and issued on Jul. 11, 2000, and U.S. Pat. No. 5,923,307, titled "Logical Monitor Configuration in a Multiple Monitor Environment", by Hogle, IV and issued on Jul. 13, 1999, through the communication channel 205. The communication channel 205 was implemented as a cable. For an example of such a forking driver see U.S. Pat. No. 6,088,005, titled "Design and Method for Large Virtual Workspace", by Walls et al. and issued on Jul. 11, 2000. The data was further routed from the graphics display adapters to the LCD display and the projection display via a cable.

It should be noted that in this embodiment all the data gathered by the input collector 220 was processed and forwarded directly on the path as described above. Therefore, the input fork and transform units 270 were unnecessary, as were the user input communication channels 245 connecting to and from the input fork and transform units. Further, the user input communication channel 245 from the input collector 220 to the image replicator 250 was also unnecessary. Accordingly, these components were not implemented in this embodiment.

The scaling of the VNC viewers was calibrated as follows:

First, a test image was displayed across the LCD display and the projection display. The scaling of the display 290 using smaller pixels, in this case the LCD display, was defined as the reference value. The size of the test image element was measured on the projection unit, and the scaling of VNC viewer was then adjusted by setting an appropriate scaling factor in the VNC viewer. The VNC viewer scaling factor was adjusted by setting the "Scaled by" factor in the Settings window. Translation was calibrated by dragging the two VNC viewer windows into the display areas associated with the LCD display and the projection display and then by using the scroll bar to adjusting the content of the VNC viewer windows. Finally the window was enlarged to full size. This implementation was feasible for running arbitrary Linux applications on the Linux computer, including image viewers, games, slide presentation programs, video-playback and others.

Embodiment 2

Unreal Tournament Implementation

Figure 5:
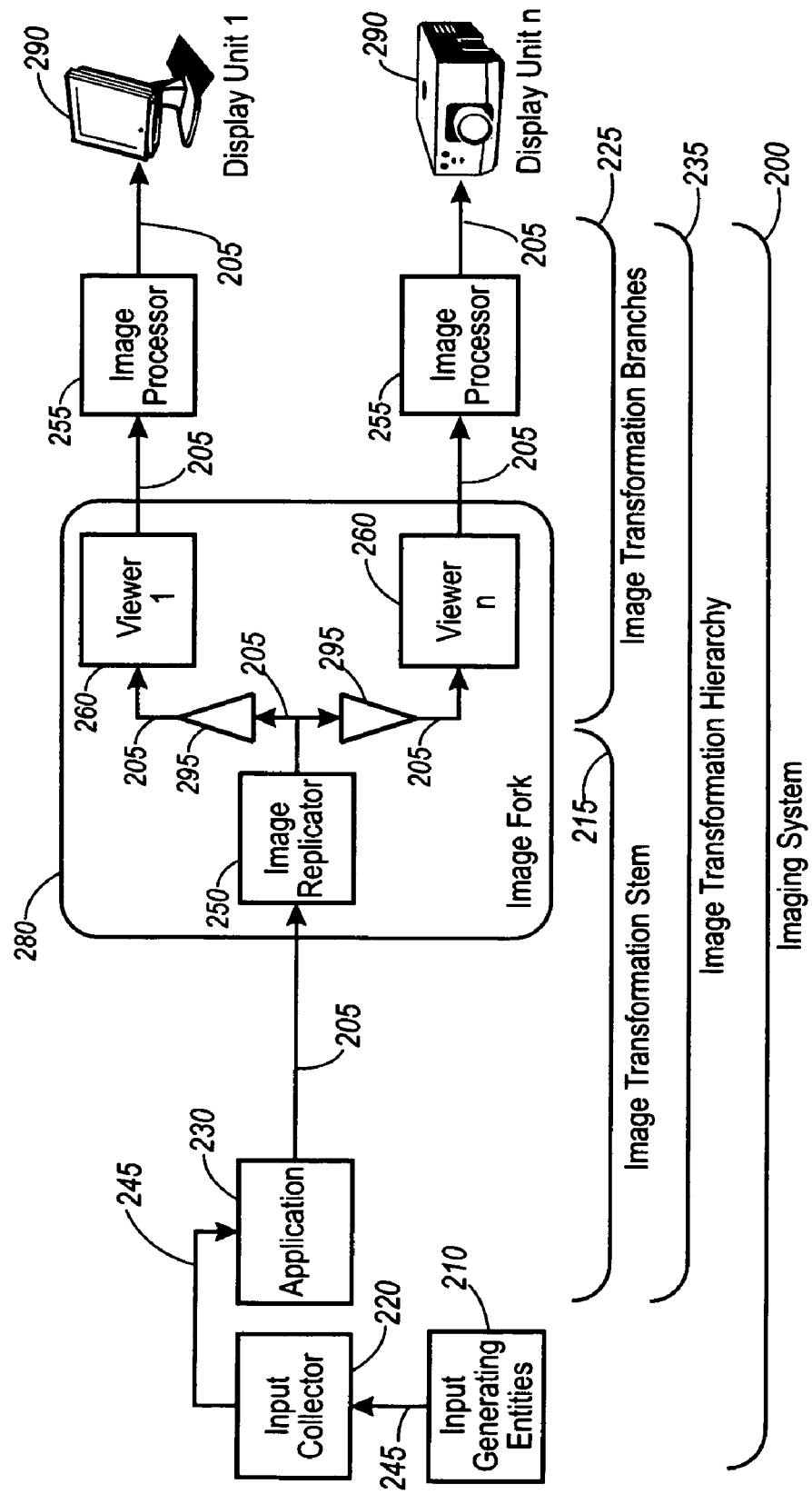
FIG. 5 is a diagram showing an alternate embodiment of the present invention.

FIG. 5 shows an embodiment where the imaging system 200 can also be used to implement a 3D game scenario, again using two computer systems linked across a network sharing the same view of a single application. As before, the views must be scaled differently to maintain visual continuity across the focus plus context display. In this implementation, the Unreal Tournament software by Epic Games was used and installed on two separate computer systems both running Microsoft Windows (Microsoft computer 1 and Microsoft computer 2). Microsoft computer 1 and Microsoft computer 2 were connected to each other via a networked setting. The Unreal Tournament software on Microsoft computer 1 was utilized as the input collector 220 and the image transformation stem 215. The data was then shared with both computers such that the Unreal Tournament software on Microsoft computer 1 implemented one of the image transformation branches 225 while Unreal Tournament software on Microsoft computer 2 implemented the other image transformation branch 225. Alternatively, a third computer also running the Unreal Tournament software in spectator mode could be used to implement the other image transformation branch instead of using Microsoft computer 1. As above, a graphics display adapter in each of the Microsoft computers was used to implement the image processors 255 and were connected via a cable to the displays 290. Also as above, the displays 290 were implemented using an LCD display and a projection system.

In order to maintain synchronization between the images on the displays 290 the game software on the Microsoft computer 2 was run in "spectator mode". Spectator mode allows Microsoft computer 2 to connect to the Unreal Tournament software on Microsoft computer 1 across the network to obtain the view parameters of the image generated by Microsoft computer 1 It should be noted that while this embodiment is very similar to the VNC embodiment discussed with respect to FIG. 4, the application 230 provides image output in a form that can be directly manipulated by the image replicator 250 and consequently that the image processor 240, which was used in FIG. 4 to transform the image data into an appropriate format for the image replicator 250, has been omitted.

Also as above, the images need to be calibrated to preserve the visual uniformity. Calibration was performed interactively by switching the image of either Microsoft computer 1 or Microsoft computer 2 to windowed mode (using the command tooglefullscreen), scaling the window content by adjusting its "field of view" (using the command fov 30) and then moving the window with the mouse. Each installation of the game on the two computers had its own base of image data. As in the implementation which utilized the VNC software, the input forking and scaling programs were unnecessary and therefore were left out. When run, the user could play the game by interacting with the Microsoft computer 1, while the displayed image was displayed across the displays of both computers.

Embodiment 3

ACDsee

Figure 6:
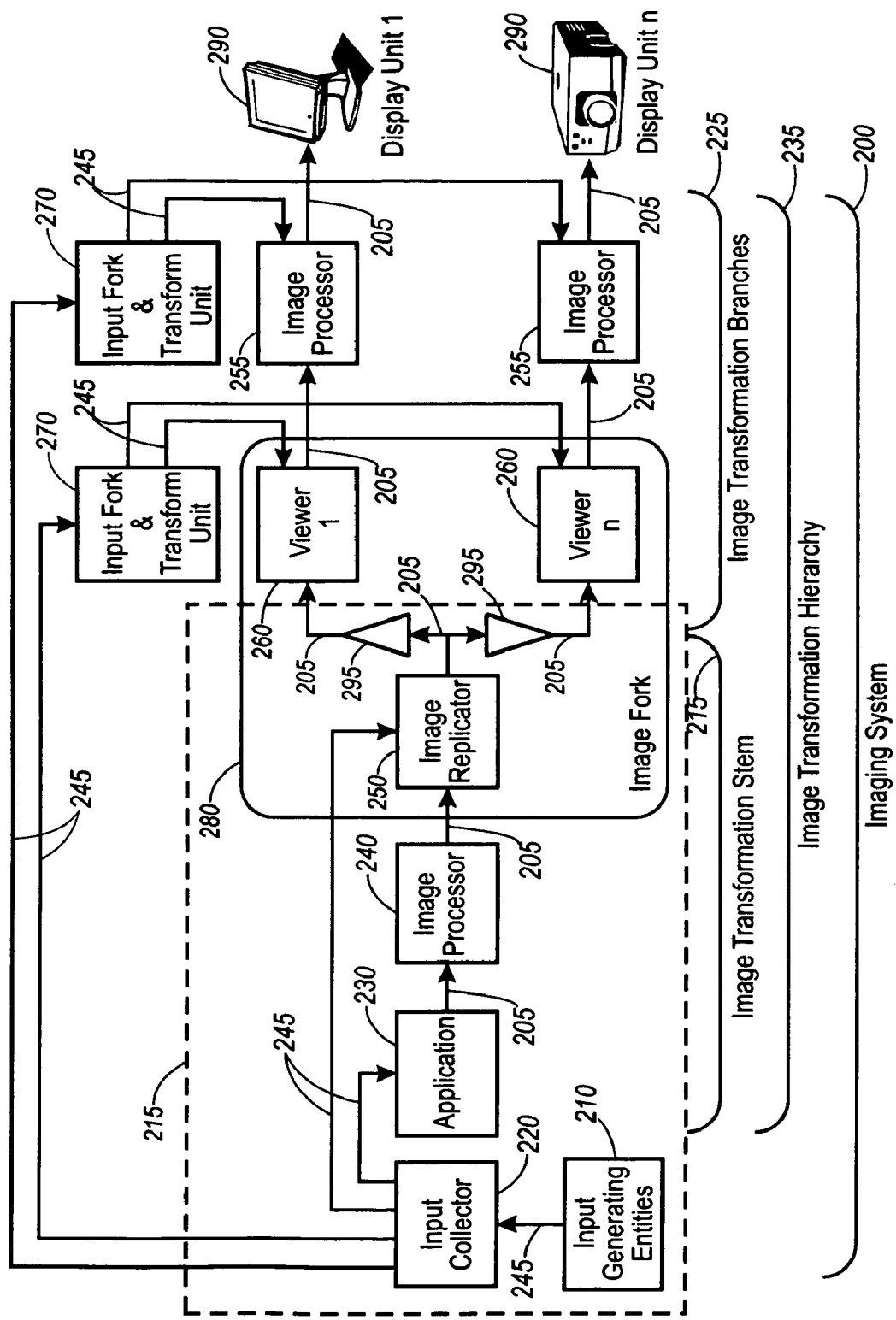
FIG. 6 is a diagram showing another alternate embodiment of the present invention.

FIG. 6 shows a diagram of an embodiment used to view previously constructed graphical data. Therefore, it can be viewed that the initial input to the system performed by the input generating entities 210, input collector 220, application 230, image processor 240, and image replicator 250 contained in subsystem 215 were all performed offline to generate the initial image data. This was done using Photoshop, available from Adobe Systems, running on a standard computer set-up, to generate and save two images files. Although, in this implementation Photoshop was used to generate the image files, this is used for exemplary purposes only and any image files in any format could have been used.

In this embodiment, the remainder of the imaging system 200 was implemented using three computers utilizing an asynchronous setup. Two of the computers were set up to run ACDsee image viewer software available from ACD systems and Microsoft Windows (Microsoft computer 1 and Microsoft computer 2). The third computer was set up to run the Linux operating system (Linux Computer) and a custom server program to be described below that acted as the input collector 220 and the input fork and transform unit 270. It should be noted that in contrast to the embodiments described above all user input, when viewing the image files, is received by the input collector 220 and sent to the input fork and transform unit 270 as the image transformation stem 215 functions were performed earlier offline in creating the initial image files and are therefore no longer available.

Microsoft computer 1 and Microsoft computer 2 were then given access to the saved Photoshop files via the network. This was done using the ACDsee image viewer software as the viewers 260. Again, as described in the embodiments above, the two images processors 255 were implemented as graphic display adaptors in the two Microsoft computer 1 and Microsoft computer 2, as well as the displays 290 being implemented using an LCD Display and a projection system. In this setup a trackball device was connected to the Linux computer as an input generating entity 210. A user could use the trackball device to pan the entire image across the mixed resolution display. Translation events from the trackball were duplicated and scaled according to the scaling factors in the input fork and transform unit 270.

The custom server program implementing the input fork and transform unit 270 received input as mouse events from the input generating entities 210, such as the trackball. The custom server program then appropriately transformed the data by scaling and forking. The custom server program then transferred the data to the custom client software residing on Microsoft computer 1 and Microsoft computer 2. The custom client program was necessary because neither Microsoft computer 1 nor Microsoft computer 2 are inherently able to listen to the network for mouse events. The custom client program then receives the scaled and forked input data and transfers it to the operating systems on Microsoft computers 1 and 2 which then interacts with the ACDsee program in the usual manner.

To calibrate the images, the system 200 was initialized with predetermined scaling factors that had been measured earlier. The image to be displayed was then duplicated, scaled and translated appropriately using the ACDsee image processing program, and the two versions were saved to a disk. To view the images, the two instances of the ACDsee image viewing software were started running on the two different computers and were given access to the saved files via the network connection. The two images were aligned by panning one of them inside the image viewer program.

Embodiment 4

Video Transmission

Figure 7:
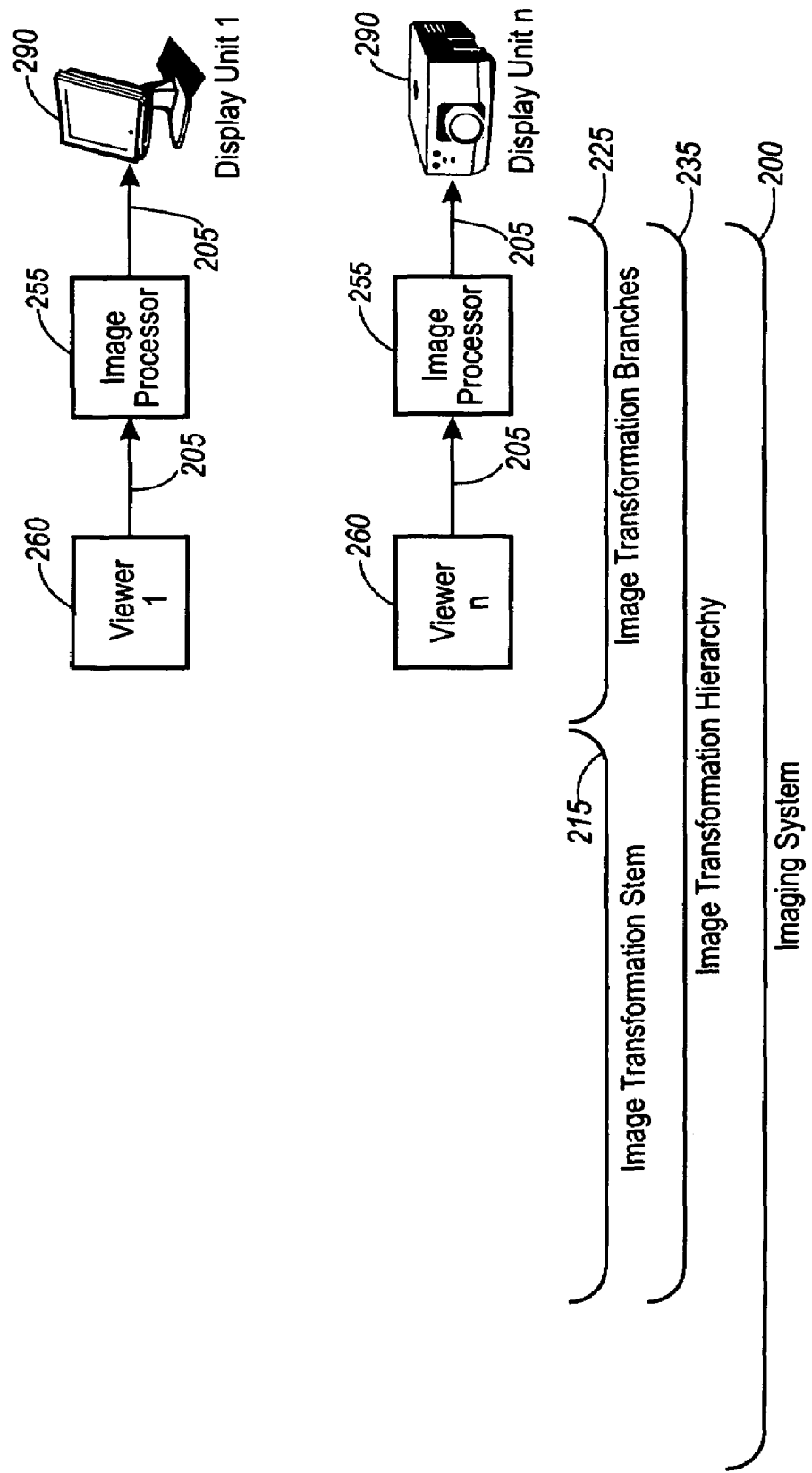
FIG. 7 is a diagram showing another alternate embodiment of the present invention.

FIG. 7 shows a diagram of an embodiment for viewing video images. The imaging system 200 has been reduced to the viewers 260 and an image processors 255. The viewers 260 were implemented using two video cameras wherein each camera has been zoomed to provide the correct scaling factors and then are used to create the video images. One camera will therefore be used to capture the large image to be displayed on the large context display while the other camera will be used to film the smaller portion of the image to be displayed on the focus display. Either analog or digital cameras could be used. If the output format of the cameras match the input format of the display then the output of the cameras can be directly connected to the respective display units 290 using drivers internal to the cameras as the image processors 205 enabling the images to be viewed synchronously while being recorded. Alternatively, the video images could be saved for later synchronous transmission, for instance by using a playback device such as a VCR. Alternatively, video images may be saved in either analog or digital image files for future playback for instance by creating AVI files and using a media player. As discussed above, the displays were implemented using an LCD display and a projection system.

Calibration of the imaging system 200 is done by moving, tilting, and zooming the cameras while monitoring the filmed image until a test image is recorded appropriately. Once the system is calibrated the cameras should be coupled together so that they are moved together and maintain the correct images. Also, the cameras may be arranged to minimize parallax, if possible. In particular, the camera used to capture the image used for the smaller focus display may be situated directly in front of the camera used to capture the larger image for context display provided however, that the camera used to capture the image for the focus display does not black any portion of the image to be displayed on the context display.

Display Hardware Embodiments

The examples described above each used an LCD display and a projection system to implement the mixed resolution displays 290 in a focus plus context displays system. However, these focus plus context display systems can be arranged in many different configurations and utilizing many different display types to obtain a mixed resolution display. The mixed resolution display can be utilized in any orientation. For example, the display area may be substantially vertical, as in a mixed resolution display standing on a table or hanging on a wall etc. The mixed resolution display could also be utilized with the display area horizontal, as in a table-like setup or tilted at an angle, or could be any other orientation that would allow a user view of its display area.

Hereinafter is a description of the various display combinations and spatial arrangements of at least two display units, at least one of them having a different pixel size from the others, to create a mixed resolution display.

Figure 8:
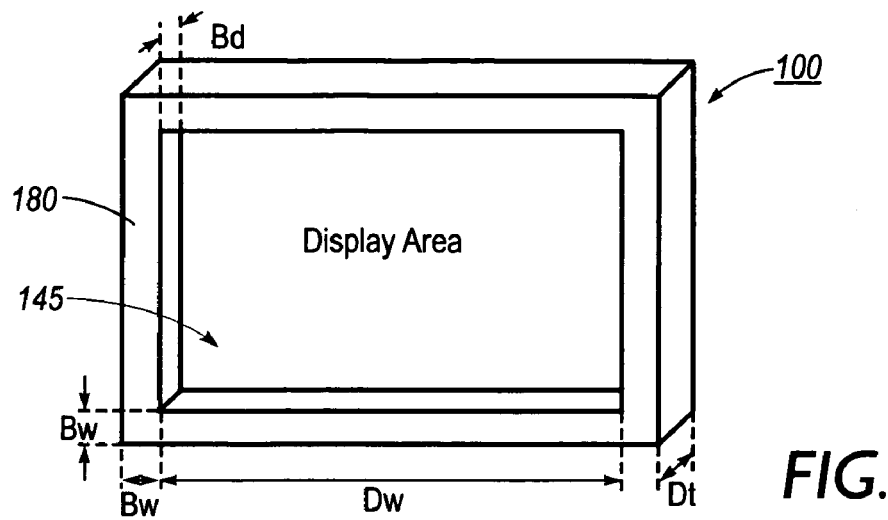
FIG. 8 is a perspective diagram of a display unit.

FIG. 8 describes a display unit 100. The display unit 100 consists of a display area 145 having a display width Dw within a border 180. The border 180 has a border width Bw and a border depth Bd and may for instance, be the display unit's casing. The border depth Bd is a measure of the amount that the border 180 projects out from the display area 145. The display unit 100 has a total depth Dt including the depth of the border 180. In the FIG. 8, while the display unit 100 is shown to be rectangular, it could in practice be any shape such as square, circular, concave, convex, other curvilinear shapes or even irregular shapes or other 3-dimensional shapes both regular and irregular. The display area 145 can be implemented with many different types of displays. It could be projected images, LCD, LED displays, CRT displays, organic displays, electric paper displays, plasma displays, or any combination of such displays with mirrors and lenses. The electric paper display may be of the type known as gyricon displays or electrophoretic displays, or of other forthcoming methods of electric paper.

Some display units 100 may be borderless. In the case of borderless displays, the border width Bw and border depth Bd are equal to zero. In FIG. 8, while the border 180 is shown to be rectangular, it could in practice be any shape such as square, circular, concave, convex, other curvilinear shapes or even irregular shapes or other 3-dimensional shapes both regular and irregular.

FIGS. 9-14 show several configurations for combining two or more displays. The same reference numerals will be used throughout the description to refer to similar elements.

Figure 9:
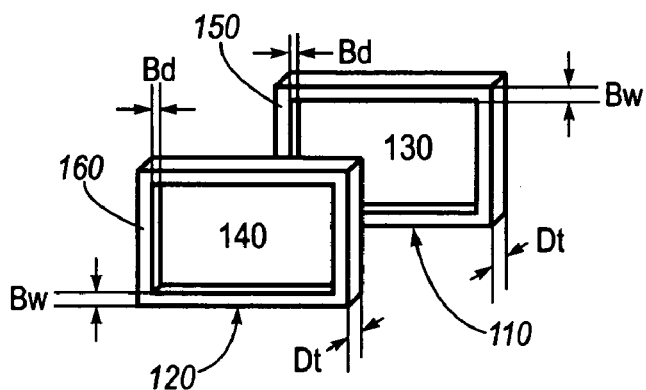
FIG. 9 is a perspective diagram of one embodiment showing the combination of two displays.

FIG. 9 describes a configuration that combines two displays 110, 120 having display areas 130, 140 where the display areas have different pixel sizes from each other One display unit 120 is located in front of the other display unit 110. Display 110 has a border 150 and display 120 has a border 160. If the border 160 of display 120 is greater than zero (i.e. is not borderless) then the border 160 will cover a portion of the display area 130 on display 110 and cause a gap in the displayed images referred to as an x/y gap. If the border width Bw and the border depth Bd of the border 160 of display unit 120 is smaller than the border width Bw and the border depth Bd of the border 150 of the display unit 110, this setup minimizes the gap in the images caused by the border 160 of the display 120 for a viewer located in front of the displays 110, 120.

The z gap distance between the two displays 110, 120 is at least the display thickness Dt of the front display unit 120 plus the border depth Bd of the rear display's border 150 minus the border depth Bd of the front display 120. In the special case that the front display 120 is entirely surrounded by the rear display 110 and abutted against the display area 130 of the rear display 110 such that their borders 160, 150 do not overlap, then the z gap is at least the display thickness Dt of the front display 120 minus its border depth Bd.

Figure 10:
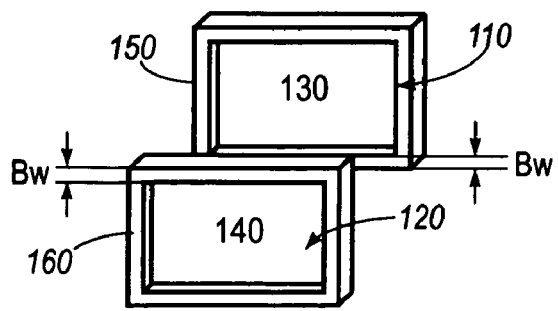
FIG. 10 is a perspective diagram of an alternate embodiment showing the combination of two displays.

FIG. 10 describes a configuration that combines two adjacent displays 110, 120 of different pixel sizes having display areas 130, 140 respectively. This arrangement allows configuring both displays 110, 120, such that their display areas 140, 130 are in the same plane, thereby minimizing the Z-gap. However, in this arrangement, the X/Y gap is at least the sum of the border width Bw of the border 150 of display 110 plus the border width Bw of border 160 of the other display 120.

Figure 11:
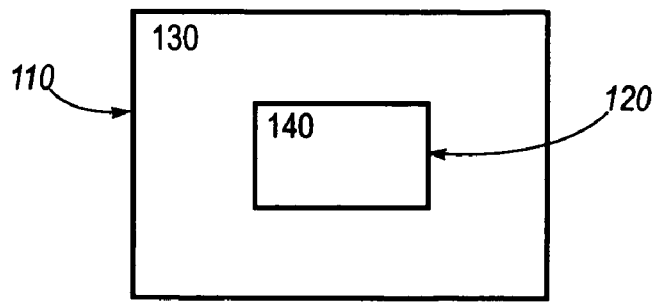
FIG. 11 is a frontal view showing an alternate embodiment of the combination of two displays.

Other combinations of two or more coplanar display are possible however, they will introduce larger X/Y gaps and Z gaps than the ones shown in FIGS. 10 and 11.

Displays can be contained within their individual own borders or casings, as in the example described in FIGS. 9 and 10, but to minimize both the X/Y and Z gaps, they may instead be contained within a single border or casing. Borders or casings may also be removed to reduce a display unit's thickness Dt and border width Bw. The display units may be manufactured separately and assembled later, such as a plasma panel and an LCD display that are combined in a single border or casing. Two or more display units 100 may be manufactured in a single process, such as an LCD display offering different pixel sizes in different regions of the display area.

FIG. 11 is a front view of a combination of two displays where the front display 120 is entirely surrounded by the rear display 110 and abutted against the display area 130 of the rear display 110. As mentioned above, the display units 110, 120 may be of any shape or orientation. For illustration purposes, the smaller display unit 120 is located approximately in the center of the large display unit 110, but in practice could be located anywhere within the larger display unit 120.

Figure 12:
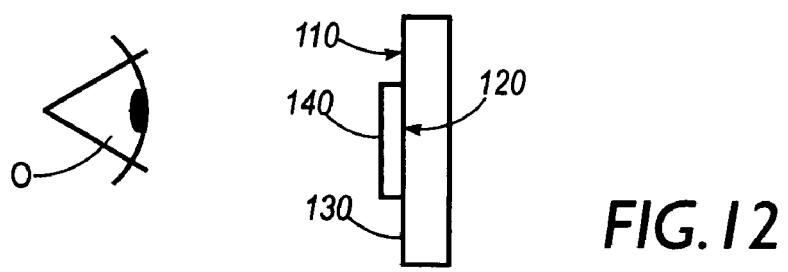
FIG. 12 is a side view showing an embodiment of the combination of two displays.
Figure 13:
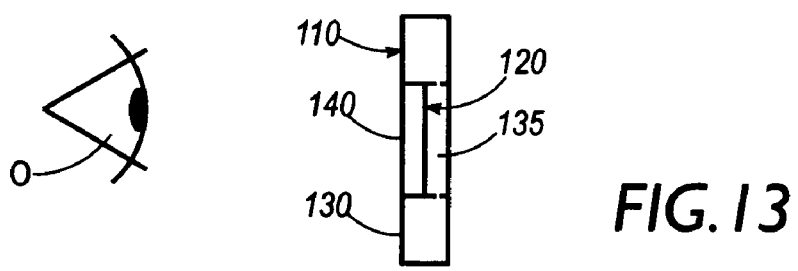
FIG. 13 is a side view showing an alternate embodiment of the combination of two displays.
Figure 14:
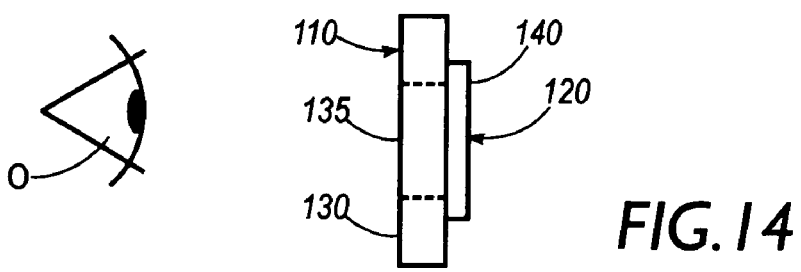
FIG. 14 is a side view showing another alternate embodiment of the combination of two displays.

FIGS. 12, 13, and 14 show three possible side views of three different embodiments of the combination of displays 110, 120 shown in FIG. 11.

FIG. 12 shows an embodiment where the smaller display 120 is placed in front of the larger display 110 as already described in FIG. 9. This configuration may be the easiest to construct as it may merely involve placing one display 120 in front of another display 110.

FIG. 13 shows an embodiment where the larger display unit 110 has an opening 135 of sufficient size allow the smaller display unit 120 to be fitted integrally within the display 110. A portion of the display area 140 on a display unit 110 may be removed prior to combining it with a display area 120 the opening may be created during the manufacturing process. This combination allows the display area 140 and the display area 130 to be substantially coplanar with each other and minimizes the z gap. If display 120 has a border however, there will still be an x/y gap.

FIG. 14 shows an embodiment where the larger display 110 has an opening 135, smaller than the display 120, and the display 120 is placed behind the display 120 such that the display area 140 is viewable through the opening 135. This configuration may be useful in circumstances where the display 120 has a border, which it is desired to hide if the resultant z gap between the displays is small enough. The opening 135 in the display 110 can be made to be of substantially the same size and shape as the display area 140 of the display 120. The display 120 may then aligned with the opening 135 such that only the display area 140 of the display 120 may be viewed through the opening 135.

The embodiments shown in FIGS. 12, 13 and 14 could consist of multiple LCD displays with different resolutions, organic displays combined with another form of display, as well as CRT displays combined with other displays. Alternative embodiments could consist of a high resolution LCD display embedded in a Plasma display, with the LCD display being the small display unit 120 and the plasma display being the large display unit 110. Yet another embodiment could consist of an LCD or similar display surrounded by an Electric paper type display. Other combinations of displays could consist of any display technology defined above combined in any manner that would provide a mixed resolution display comprised of display units that would not interfere with one another.

Figure 15:
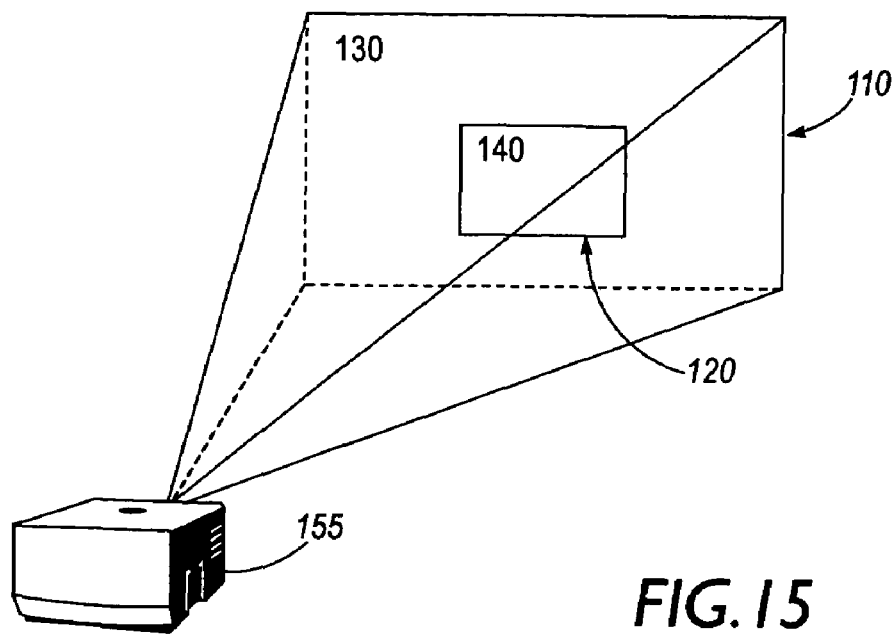
FIG. 15 is a perspective view of an embodiment of a combination of two displays utilizing a projection system.

FIG. 15 shows an embodiment implementing the configuration shown in FIG. 11 with a projection unit 155 and a sheet of projection material as the display surface 130 for display 110 and an LCD for the smaller display 120. The display area 130 may be given any arbitrary shape including shapes that have openings and are borderless. The projection surface can be made of various materials, such as canvas, paper, cardboard, plastic, and coated materials, such as metal, etc. The projection surface can be produced in any desired shape by cutting a larger piece of material into the desired shape, by assembling it from multiple pieces of material, or any combination of the above. The projection can be adapted to the shape of the projection surface by occluding part of it, either physically by blocking the projection in that region by placing a physical object in the way of the light rays, or in the imaging system 200 (shown in FIG. 1), by utilizing an image processor 240 that imposes a null image over those parts of the projection image that would not fall onto the projection surface 130. For example, it may be desirable to prevent projection of an image on the smaller display 120.

This image processor 240 generating the null image can be implemented in software or hardware. In an embodiment of the image processor 240 generating the null image, the null image is created by a software windowing program which created a black image, essentially a black window with not title or borders that could be sized and moved either manually or automatically that occluded the projection image in the area of the smaller display 120. The null image was non-selectable to prevent it from being accidentally selected and sized, moved or otherwise changed. The null image resided on the top most image or window layer so that it occluded all images in the region. The null image can be created by any windowing system such as Windows or Xwindows. In order to enable selection of elements shown on the display 120 the null image must also be transparent to mouse events. When the null image is set at the proper size and position, it then assumes a form as described above preventing the projection system 155 from projecting an image on the display 120. Projection surfaces can be made borderless and very thin, for instance when they are made of paper or plastic, therefore they facilitate easy integration of two or more displays into a mixed resolution display which has substantially no X/Y gap between displays and a small Z gap allowing the user to perceive the image as continuous across the two displays.

Figure 16:
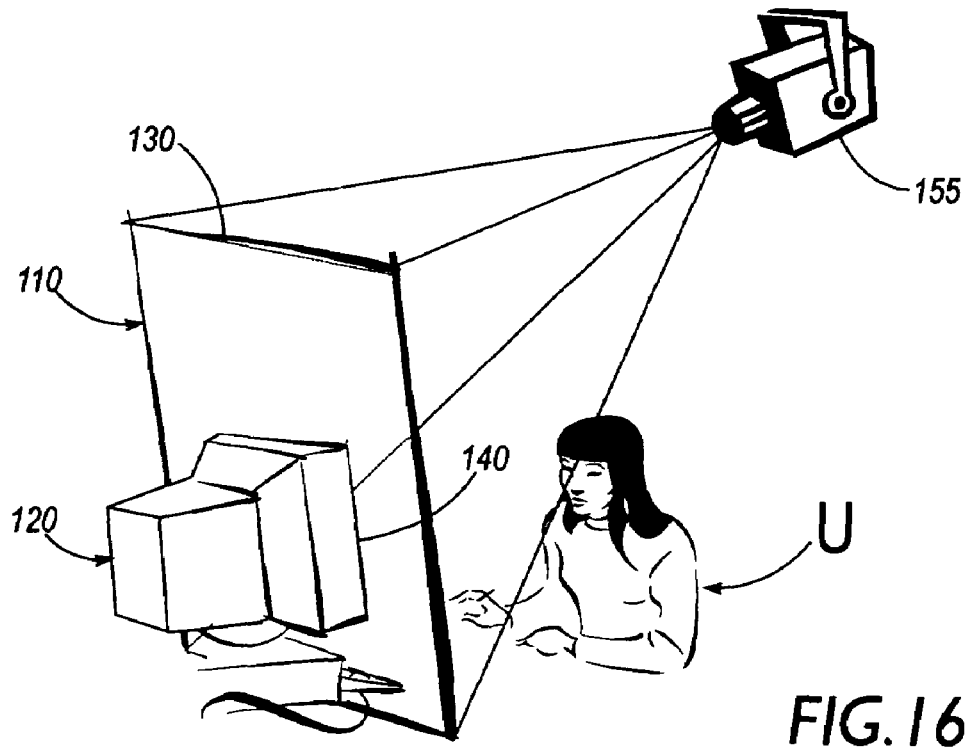
FIG. 16 is a perspective view of an alternate embodiment of a combination of two displays utilizing a projection system.

FIG. 16 shows another perspective view of the embodiment of a mixed resolution display shown in FIG. 15 where the display 110 was implemented using a projection system that includes the projector 155 and a projection surface for the larger display area 130. The projection system 155 is placed above a user U to minimize the user U casting a shadow on the projected image and blocking out part of the projected image. The smaller display unit 120 was implemented using a display unit with a substantially flat display area and a small border depth Bd, such as a flat CRT, an LCD, a plasma display, a back projection display, an LED displays, an organic display, or an electric paper display, etc to minimize the z gap between the display images. The display surface 130 of the display 110 was assembled using a combination of foam core and paper with an opening therethrough to accommodate the display 120.

The configuration shown in FIG. 16 utilized the arrangement principle described in FIG. 13 although that was not necessary and the arrangements discussed with respect to FIGS. 12 or 14 are also feasible. If the arrangement shown in FIG. 12 had been utilized, it would not have required an opening in the projection surface. This would allow for using a wider range of materials for the projection surface, such as solid materials; for example walls.

If the border 160 of the display 120 is visible then the border 160 of the display 120 may be covered with a material to create an additional projection surface on the border 160. To minimize gaps, the addition projection surface should be tightly fitted to the display 120 occlude the entire border 160 of the display 120. However, the additional may be larger than the border 160 so that it overlaps the projection surface. The projected image from the projection system 155 should then be adjusted to project on the combined projection surface of the display surface 130 and the additional projection surface covering the border 160. The additional projection surface over the border 160 of the display unit 120 can be made of the same or a different material than the large projection surface used for display surface 130 and may be made to be interchangeable.

Figure 17:
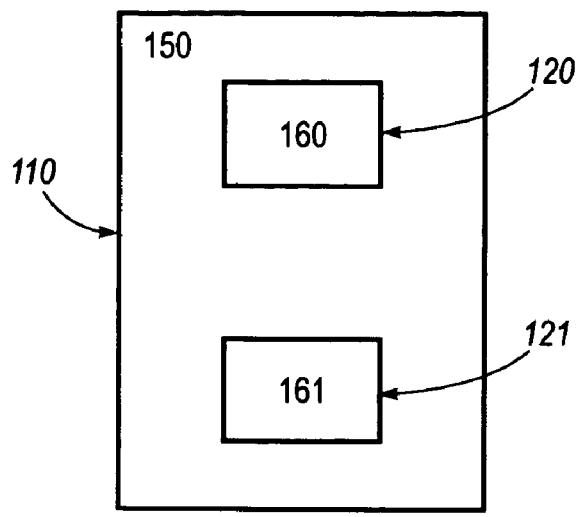
FIG. 17 is a frontal view of an embodiment combining three displays.
Figure 18:
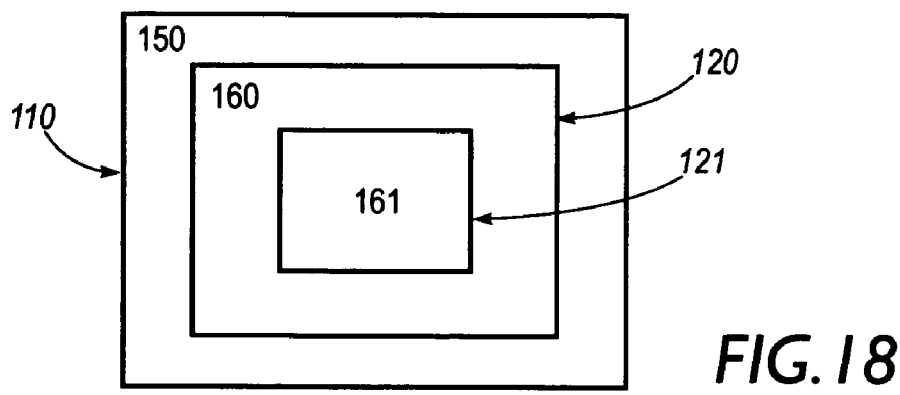
FIG. 18 is a frontal view of an alternate embodiment combining three displays.
Figure 19:
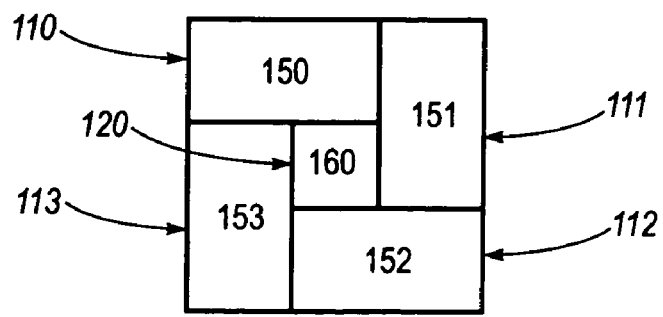
FIG. 19 is a frontal view of an embodiment combining five displays.

In the embodiments described above, the display hardware of a mixed resolution display consisted of two displays. However, mixed resolution displays can be created by arranging three or more displays. FIGS. 17, 18 and 19 show embodiments consisting of three or more displays.

FIG. 17 shows an embodiment with multiple smaller displays 120, 121 having display surfaces 160, 161 respectively, surrounded by a large display unit 110 having a display surface 150. This type of embodiment can be used to build video walls utilizing a tiled arrangement of displays, and interactive installations, such as conference tables, comprising one or more small displays 120, 121 for each user combined with a large display 110. It can also be used for interactive whiteboards, which include one or more small displays 120, 121 for each user combined with a large display 110. Each of the display units 110, 120, 121 could be implemented as a single display, or they could be implemented as configurations of multiple displays.

FIG. 18 shows another embodiment, with a display 121 having display area 162 nested inside a display 120 with a display area 160 which is nested inside a third display 110 having a display area 150. Again, each of the displays could be implemented as a single display, or as configurations of multiple displays.

FIG. 19 shows a tiled configuration of four displays 110, 111, 112, 113 having display areas 150, 151, 152, 153 that surround a single display 120 having a display area 160. Displays 110, 111, 112, 113 may be combined as shown in FIGS. 9 and 10. The display 120 may be added as shown in FIGS. 12-13. Each of the displays could again be implemented as a single display or as configurations of multiple displays.

What is claimed is:

1. A display for displaying a single perceived continuous image across multiple display devices such that a portion of the single image is displayed on each device comprising:
    a) a first display device having a first display area with a first display resolution and a first boundary, so arranged and adapted to receive first image information data from a first image processor;
    b) a second display device having a second display area with a second display resolution, wherein the second display resolution is different from the first display resolution, and a second boundary, so arranged and adapted to receive second image information data from a second image processor;
    c) a third display device having a third display area so arranged and adapted to receive third image information data;
    d) an image replicator configured to generate different first and second scale factors necessary to scale the first and second image information data for display on the first and second display devices, respectively, wherein the first and second image information data is scaled by the first and second scale factors for display on the respective first and second display devices, and
    e) the first, second, and third display devices being so constructed and arranged such that when the first image information data is displayed on the first display device, the second image information data is displayed on the second display device, and the third image information data is displayed on the third display device the resulting displayed single image appears to be substantially continuous across the first, second, and third display areas to a viewer situated to view the image and the displayed resolution of the portion of the image displayed on the first display area is different than the displayed resolution of the portion of the image displayed on the second display area such that one of: scaling, brightness, color, and translation of the displayed first image information data and the displayed second image information data are both within a predetermined tolerance value,
    wherein the first display area surrounds the second and third display areas, and
    the second and third display areas are spaced apart with a portion of the first display area interposed therebetween.

2. The display of claim 1 wherein one display device comprises an LCD display.

3. The display of claim 1 wherein one display device comprises a projector and a projection surface.

4. The display of claim 1 wherein the first and second boundaries are at least partially contiguous.

5. The display of claim 1 wherein one display area is adjacent to another display area.

6. The display of claim 1 wherein the third display resolution is different from at least one of the first display resolution and the second display resolution.

7. A display comprising:
    at least three display devices, each display device having a display area with a given display resolution wherein the display resolution of at least one display area is different from the display resolution of at least one other display area, a boundary wherein the boundary of each display area is at least partially contiguous with the boundary of at least one other display area, and an associated image processor for providing image information data, the display devices being so constructed and arranged such that when a single image is displayed across the at least three display areas using image information data received from the associated image processors, the resulting displayed image is perceived as substantially continuous to a viewer situated to view the image and the displayed resolution of the portion of the image displayed on one of the at least three display areas is different than the displayed resolution of the portion of the image displayed on at least one other of the at least three display areas such that one of: scaling, brightness, color, and translation of the displayed portion of the image displayed on one of the at least two display areas and the displayed portion of the image displayed on at least one other of the at least two display areas are both within a predetermined tolerance value; and
    an image replicator configured to generate at least two different scale factors to scale the image information data displayed on corresponding ones of the at least three display devices, wherein the image information data is scaled by the at least two different scale factors for display on corresponding ones of the at least three display devices, wherein the display area of a first display device of the at least three display devices surrounds the display areas of a second display device and a third display device of the at least three display devices, and the display areas of the second and third display devices are spaced apart with a portion of the display area of the first display device interposed therebetween.

8. The display of claim 7 wherein at least one display area comprises an LCD display.

9. The display of claim 7 wherein at least one display area comprises a projection surface.

10. The display of claim 7 wherein there are 5 display areas.

11. A display for displaying a single perceived continuous image across three display devices such that a portion of the single image is displayed on each device comprising:

a) means for displaying a first portion of an image on a first display area of a first display device, the first display area having a first display resolution and a first boundary;

b) means for displaying a second portion of the image on a second display area of a second display device, the second display area having a second display resolution, wherein the second display resolution is different from the first display resolution, and a second boundary;

c) means for displaying a third portion of the image on a third display area of a third display device;

d) an image replicator configured to generate different scale factors to scale the first and second portions of the image displayed on corresponding ones of the first and second display devices, wherein the first and second portions of the image are scaled by the scale factors for display on the corresponding ones of the first and second display devices; and e) the first, second, and third means for displaying being so constructed and arranged such that when a combined image comprising at least a portion of the first portion of the image displayed in the first display area, at least a portion of the second portion of the image displayed in the second display area, and at least a portion of the third portion of the image displayed in the third display area are displayed the resulting combined image appears to be substantially continuous to a viewer situated to view the image and the displayed resolution of the first portion of the image is different than the displayed resolution of the second portion of the image such that one of: scaling, brightness, color, and translation of the displayed at least a portion of the first portion of the image and the displayed at least a portion of the second portion of the image are both within a predetermined tolerance value, wherein the first display area surrounds the second and third display areas, and the second and third display areas are spaced apart with a portion of the first display area interposed therebetween.

12. The display of claim 11 wherein one display device comprises an LCD display.

13. The display of claim 11 wherein one display device comprises a projector and a projection surface.

14. The display of claim 11 wherein one display area is adjacent to another display area.

\* \* \* \* \*